(12) United States Patent
Hillard et al.

(10) Patent No.: US 6,697,856 B1
(45) Date of Patent: Feb. 24, 2004

(54) HEALING OF INCOMPLETE CIRCUITS IN NETWORKS

(75) Inventors: David A. Hillard, Novato, CA (US); Venkataraman Anand, Rohnert Park, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/444,052

(22) Filed: Nov. 19, 1999

(51) Int. Cl.[7] .............................................. G06F 15/173
(52) U.S. Cl. ........................................ 709/224; 709/218
(58) Field of Search .................................. 370/217, 397, 370/14, 16; 385/24; 709/218, 224; 340/506; 714/4; 359/110

(56) References Cited

U.S. PATENT DOCUMENTS

| | | | |
|---|---|---|---|
| 5,233,600 A | * 8/1993 | Pekarske | 370/228 |
| 5,444,693 A | * 8/1995 | Arslan et al. | 370/221 |
| 5,600,794 A | 2/1997 | Callon | 395/200.01 |
| 5,657,320 A | * 8/1997 | Russ et al. | 340/825.01 |
| 5,717,796 A | * 2/1998 | Clendening | 359/119 |
| 5,881,246 A | 3/1999 | Crawley et al. | 395/200.68 |
| 5,913,921 A | 6/1999 | Tosey et al. | 709/220 |
| 5,917,820 A | 6/1999 | Rekhter | 370/392 |
| 6,294,991 B1 | * 9/2001 | Allen et al. | 340/506 |
| 6,301,254 B1 | * 10/2001 | Chan et al. | 370/397 |
| 6,308,282 B1 | * 10/2001 | Huang et al. | 714/4 |
| 6,389,462 B1 | * 5/2002 | Cohen et al. | 707/10 |

* cited by examiner

*Primary Examiner*—Kristine Kincaid
*Assistant Examiner*—Sindya Narayanaswamy
(74) *Attorney, Agent, or Firm*—Campbell Stephenson Ascolese LLP

(57) ABSTRACT

A network management system (114) automatically heals incomplete circuits through a network element (120C) in response to a network manager's command to heal circuits interrupted at the network element.

21 Claims, 12 Drawing Sheets

Microfiche Appendix Included
(4 Microfiche, 326 Pages)

HEALING OF INCOMPLETE CIRCUITS IN NETWORKS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present application contains a microfiche Appendix 1. The total number of microfiche in Appendix 1 is 4. The total number of frames in Appendix 1 is 326. Appendix 1 is copyrighted.

BACKGROUND OF THE INVENTION

The present invention relates to establishing circuits in networks, and more particularly to healing of incomplete circuits.

A SONET network includes a number of network elements (NE's) interconnected by optical or electrical links. Data are transmitted over the links in transport signals, called Synchronous Transport Signals (STS's) and Virtual Tributaries (VT's). The network elements cross-connect the transport signals to form circuits through the network. Data (voice, computer files, or other kinds of data) from one or more network users can be inserted into a circuit at one end of the circuit (at a source NE). The data can be dropped from the circuit at the other end (a drop NE) for delivery to the destination or destinations. (A circuit may have more than one drop NE.)

Circuits are typically set up by a network manager (a human) via a network management system. The management system can run on a separate computer connected to one of the NE's. The network manager uses the network management system to define how the transport signals should be cross-connected by the NE's. That information is delivered to the NE's over the network. The NE's automatically set up their cross-connections accordingly.

Setting up circuits can be a confusing task, especially in high bandwidth networks in which multiple transport signals can go over the same physical link. It is desirable to make it easier for a network manager to set up circuits. In particular, it is desirable to make it easier to heal incomplete circuits. Incomplete circuits may result, for example, when a new network element is inserted into the network between other network elements. A link between the other network elements can be replaced by new links connecting the other network elements to the new network element. As a result, the circuits going over the link that has been removed become incomplete. It is desirable to make it easier for the user to heal such circuits.

SUMMARY

The present invention facilitates healing of incomplete circuits. Computer circuitry (for example, a computer running a network management system) discovers points at which the incomplete circuit is interrupted. For example, if a network element NE1 is inserted between network elements NE2 and NE3, a circuit may become interrupted at ports of NE's NE2, NE3 which are connected to NE1. The computer circuitry (e.g., the NMS) determines a cross-connection to be set up on an NE (e.g., NE1) to continue the circuit through the NE. The computer circuitry can send a command to the NE to set up the cross-connection to continue the circuit through the NE.

The invention is not limited to the embodiments described above. The invention is not limited to SONET or any other kind of network. The invention is defined by the appended claims.

DESCRIPTION OF PREFERRED EMBODIMENTS

Figure 1:
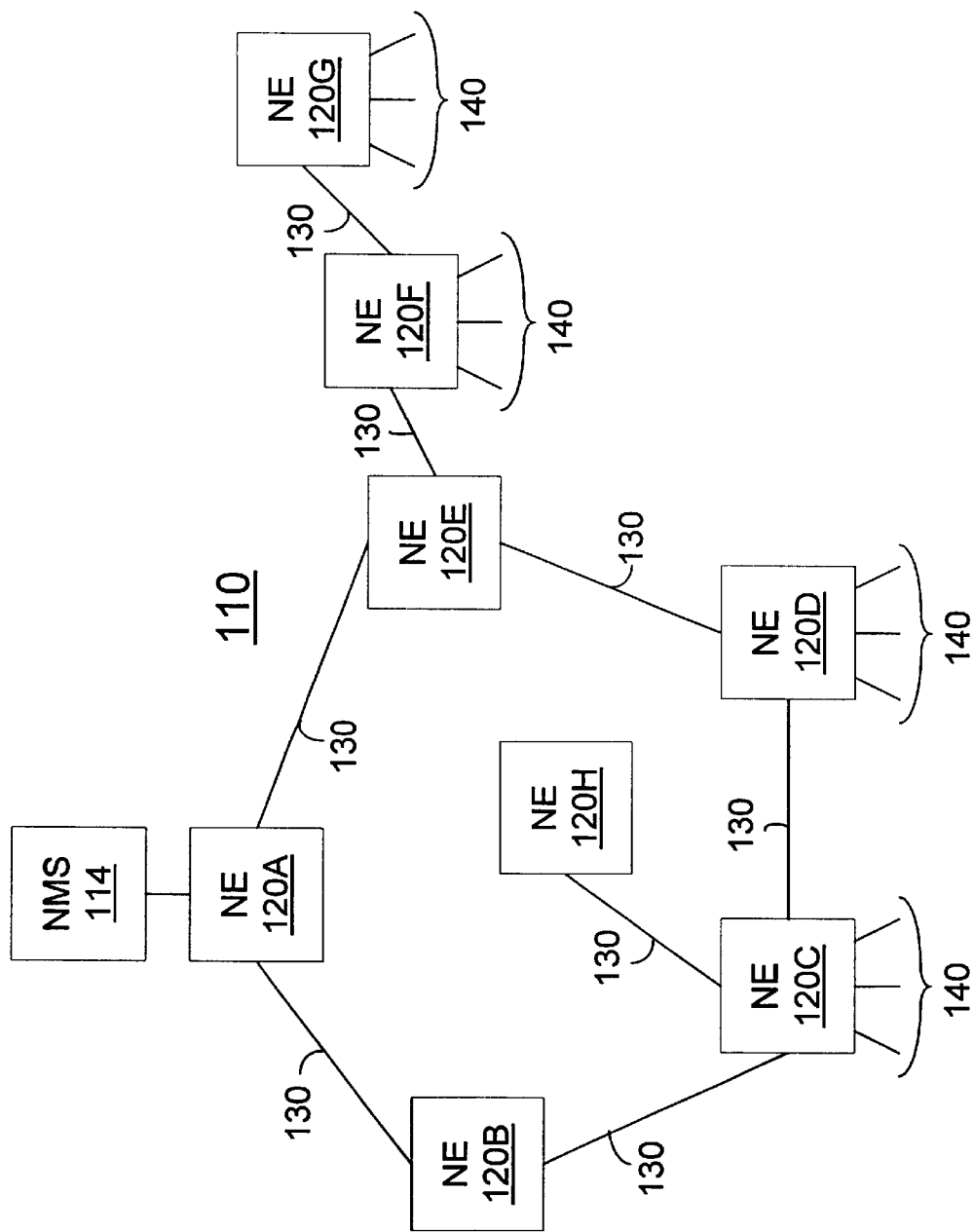
FIG. 1 is a block diagram of a network managed according to the present invention.

FIG. 1 illustrates a network 110 which can be a telephone network, a data network, or any other type of computer network. In some embodiments, network 110 is a SONET network. Network 110 may or may not be part of a larger SONET network. Network 110 is managed by a network management system 114. In FIG. 1, network 110 includes eight network elements (NE's) 120A through 120H, though any other number of NE's is possible. The NE's are interconnected by links 130. In some embodiments, links 130 are optical fiber links. Other types of links are also possible. An optical fiber link 130 includes an optical fiber cable or multiple cables connected serially, possibly via regenerators, as known in the art. Two NE's may be interconnected by more than one link. For example, in FIG. 2, the NE's 120B and 120C are interconnected by two links 130.1 and 130.2 going in the opposite directions. Similarly, NE's 120C and 120D are interconnected by two links 130.3, 130.4 going in the opposite directions.

In SONET embodiments, each link 130 carries one or more transport signals, i.e. STS's or VT's. Each transport signal is transmitted at regular intervals of time, every 125 μs, whether or not the signal carries any useful data. The data for the signals' payloads are provided by other networks or network stations (not shown) connected to one or more NE's 120 by links 140. NMS 114 allows a user (e.g. a network manager) to configure the NE cross connects so that the traffic arriving on a given link 140 at an NE 120 becomes inserted by the NE into the payload of a given transport signal, or so that an NE 120 drops a transport signal payload onto a given link 140.

Links 140 can be of any type, for example, OCn, DS1, Ethernet, or other types.

Each NE 120 has STS cross-connect capability. One or more NE's 120 may also have VT cross-connect capability.

Figure 2:
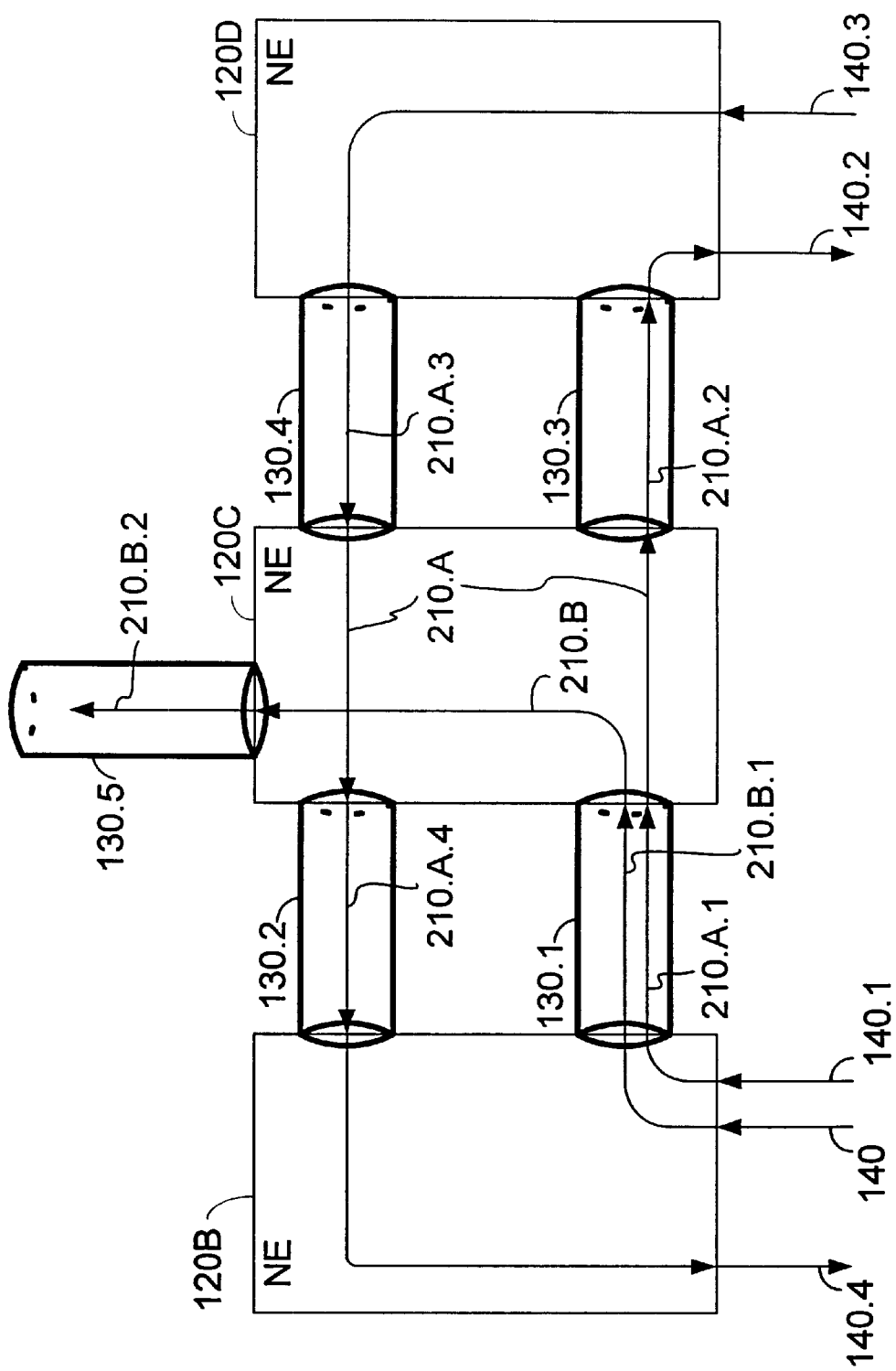
FIGS. 2–4 are block diagrams showing network elements, links, and circuits in embodiments of the present invention.

NE cross connects are typically configured by the user to set up STS and/or VT circuits in network 110. FIG. 2 illustrates two such circuits. Each circuit includes one or more segments. The segments of the circuits of FIG. 2 are described in Table 1 below. Each segment is associated with a link 130 and a transport signal (an STS or a VT). A circuit is defined by its segments and corresponding NE cross connects which determine how the circuit segments are interconnected.

TABLE 1

Circuits of FIG. 2

| Circuit | STS or VT circuit? | Segment | Link STS and VT |
|---------|--------------------|---------|-----------------|
| 210.A | STS | 210.A.1 | 130.1 STS-1 no. 2 |
|  |  | 210.A.2 | 130.3 STS-1 no. 1 |
|  |  | 210.A.3 | 130.4 . . . |
|  |  | 210.A.4 | 130.2 . . . |
| 210.B | VT | 210.B.1 | 130.1 STS-1 no. 3, VT no. 2 |
|  |  | 210.B.2 | 130.5 STS-1 no. 3, VT no. 4 |

Circuit 210.A is bi-directional. Its segments 210.A.1, 210.A.2 carry traffic from NE 120B to NE 120D. Segments 210A.3, 210A.4 carry traffic in the opposite direction. Segment 210A.1 carries data that has arrived at NE 120A on a link 140.1 (one of links 140 of FIG. 1). NE 120B cross connects these data onto STS-1 no. 2 on link 130.1. NE 120C cross-connects this STS-1 signal onto STS-1 no. 1 on link 130.3, i.e. onto segment 210A.2. NE 120D cross connects the STS-1 no. 1 onto link 140.2.

The traffic carried by circuit segments 210A.3, 210A.4 is added at NE 120D from link 140.3 and dropped at NE 120B onto link 140.4.

Links 140.2, 140.3 may or may not be the same physical media (e.g., an Ethernet bus). Similarly, links 140.1, 140.4 may or may not be the same physical media.

Circuit 210.B (segments 210.B.1, 210.B.2, and other segments, not shown) is a uni-directional VT circuit. Segment 210.B.1 is carried by link 130.1, STS-1 no. 3, VT no. 2. The VT number uniquely identifies the VT, that is, it identifies both the VT group and the VT number within the group. NE 120C switches the VT of segment 210.B.1 onto link 130.5, STS-1 no. 3, VT no. 4. This latter VT forms circuit segment 210.B.2. The remaining circuit segments are not shown.

The user adds, deletes, or modifies circuits by providing appropriate information to management system 114. Management system 114 sends appropriate data to NE's 120 to allow the NE's to configure themselves as specified by the user. The NE's automatically configure themselves to provide appropriate cross-connects.

Figure 3:
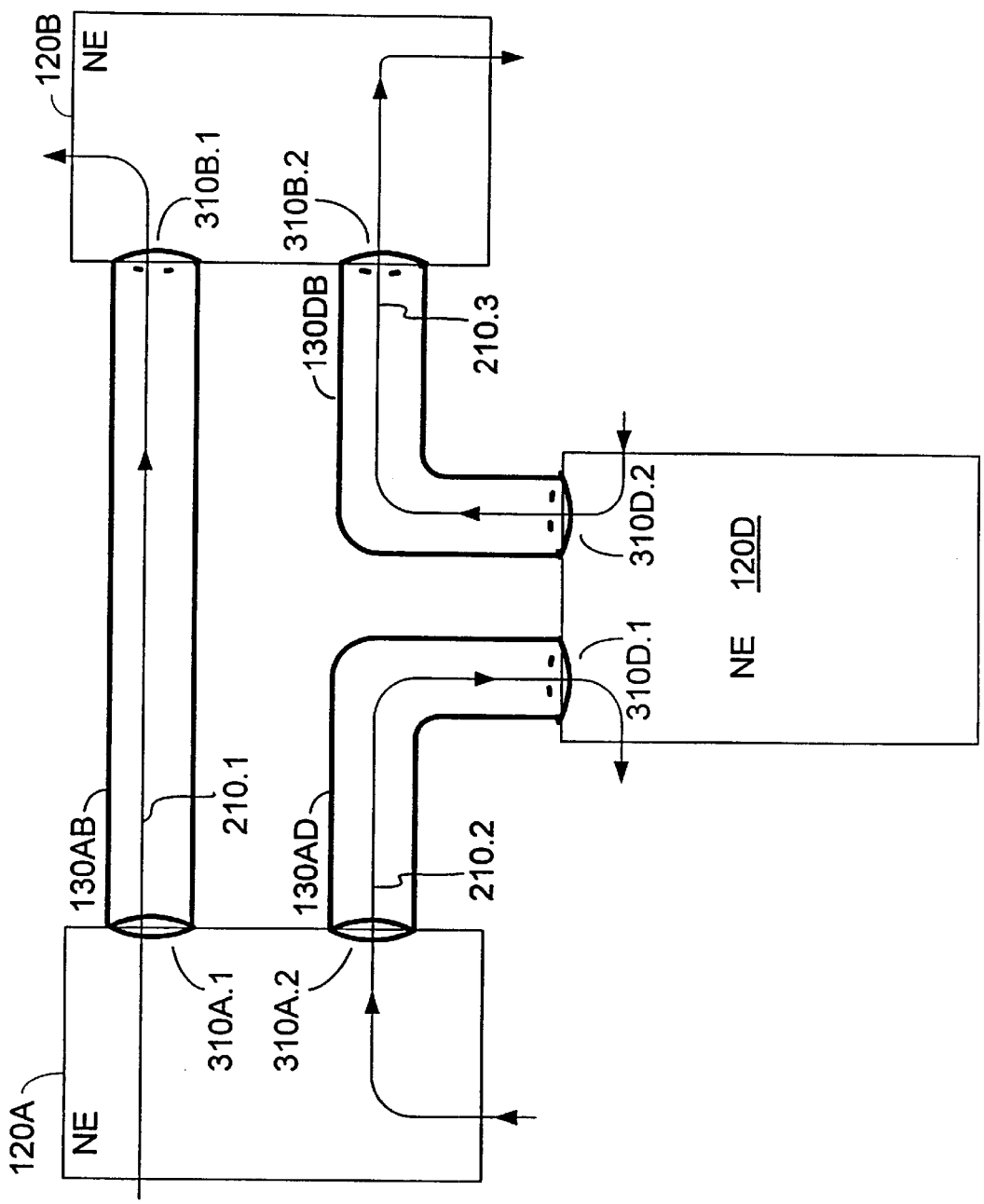
Figure 4:
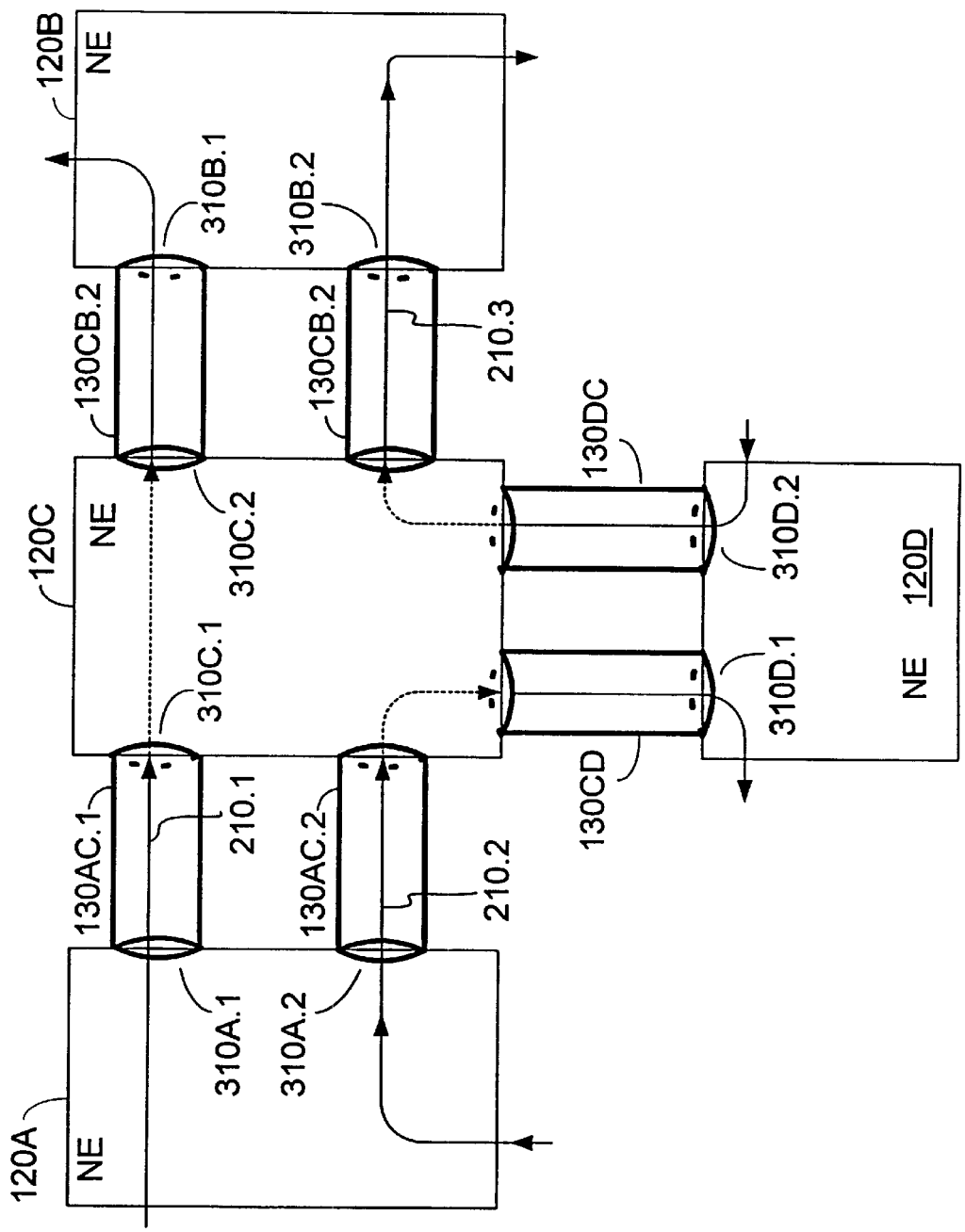

FIGS. 3 and 4 illustrate formation of incomplete circuits when a new NE is added to the network. FIG. 3 shows the network before the NE is added. Circuit 210.1 goes over a link 130AB from a port 310A.1 of NE 120A to a port 310B.1 of NE 120B. Circuit 210.2 goes over a link 130AD from a port 310A.2 of NE 120A to a port 310D.1 of NE 120D. Circuit 210.3 goes over a link 130DB from a port 310D.2 of NE 120D to a port 310B.2 of NE 120B.

In FIG. 4, NE 120C has been inserted. Links 130AB, 130AD, 130DB have been removed. A new link 130AC.1 connects the port 310A.1 of NE 120A to a port 310C.1 of NE 120C (in that direction). Link 130CB.2 connects a port 310C.2 of NE 120C to port 310B.1 of NE 120B. Circuit 210.1 is incomplete at NE's 120A, 120B. The circuit will become complete when NE 120C is programmed to cross-connect the corresponding STS or VT from port 310C.1 to port 310C.2.

In some embodiments, NMS 114 (FIG. 1) automatically programs the NE 120C cross-connect to continue the circuit through the NE.

Similarly, link 130AC.2 connects the port 310A.2 to a port of NE 120C. Link 130CD connects a port of NE 120C to the port 310D.1. Circuit 210.2 is incomplete, but will be completed when NE 120C cross-connects are suitably programmed.

Similarly, link 130DC connects the port 310D.2 to NE 120C. Link 130CB.2 connects NE 120C to the port 310B.2. NMS 114 completes the circuit 210.3 by programming the cross-connects on NE 120C.

In some embodiments, the cross-connects on NE 120C are set up on a circuit-by-circuit basis. We will now describe one such embodiment. In this embodiment, each port 310 is bi-directional. Each port connects to a pair of links going in the opposite directions. The other end of each pair of links also connects to a single port 310 on some NE. The invention is not limited to such embodiments, however.

In the embodiment being described, each NE 120 includes one or more computer processors 510 (FIG. 5) and computer storage 516, as known in the art. NMS 114 is executed on a separate computer system having one or more processors 520 (FIG. 6), storage 530, a screen 540, and an input device 550 (for example, a keyboard, a mouse, or some other device known or to be invented). The computer on which the NMS 114 is executed is connected to NE 120A (FIG. 1) via an Ethernet link or some other link. The NMS software is written in the Java object-oriented programming language described, for example, in K. Arnold and J. Gosling, "The Java™ Programming Language," 1996 (Sun Microsystems, Inc.). The software uses a Java development kit available from Sun Microsystems, Inc., of Mountain View, Calif. The software instructions and data are stored on computer readable media (e.g. magnetic disks or semiconductor memory). The NMS is developed at Cerent Corporation (now Cisco Systems, Inc.) of Petaluma, Calif.

NE's 120 run software to configure their databases (described below in connection with FIG. 5) and to communicate with each other and with NMS 114. The NE's communicate with NMS 114 via CORBA interface described in many publications. Pertinent portions of the source code for NMS 114 are provided in microfiche Appendix 1. However, the invention is not limited to Java, CORBA, to any programming language or any interface techniques, or even to software. The software embodiments are not limited to object oriented programming techniques. In some embodiments, NMS 114 runs on one or more of the NE's 120 rather than on a separate computer or computers.

Insertion of a new NE 120 may require links to be disconnected. For example, links 130AB, 130AD, 130DA are disconnected in FIGS. 3 and 4. Before links are disconnected, the user may use NMS 114 to force traffic away from these links to protection channels as known in the art.

I. Discovery

Figure 5:
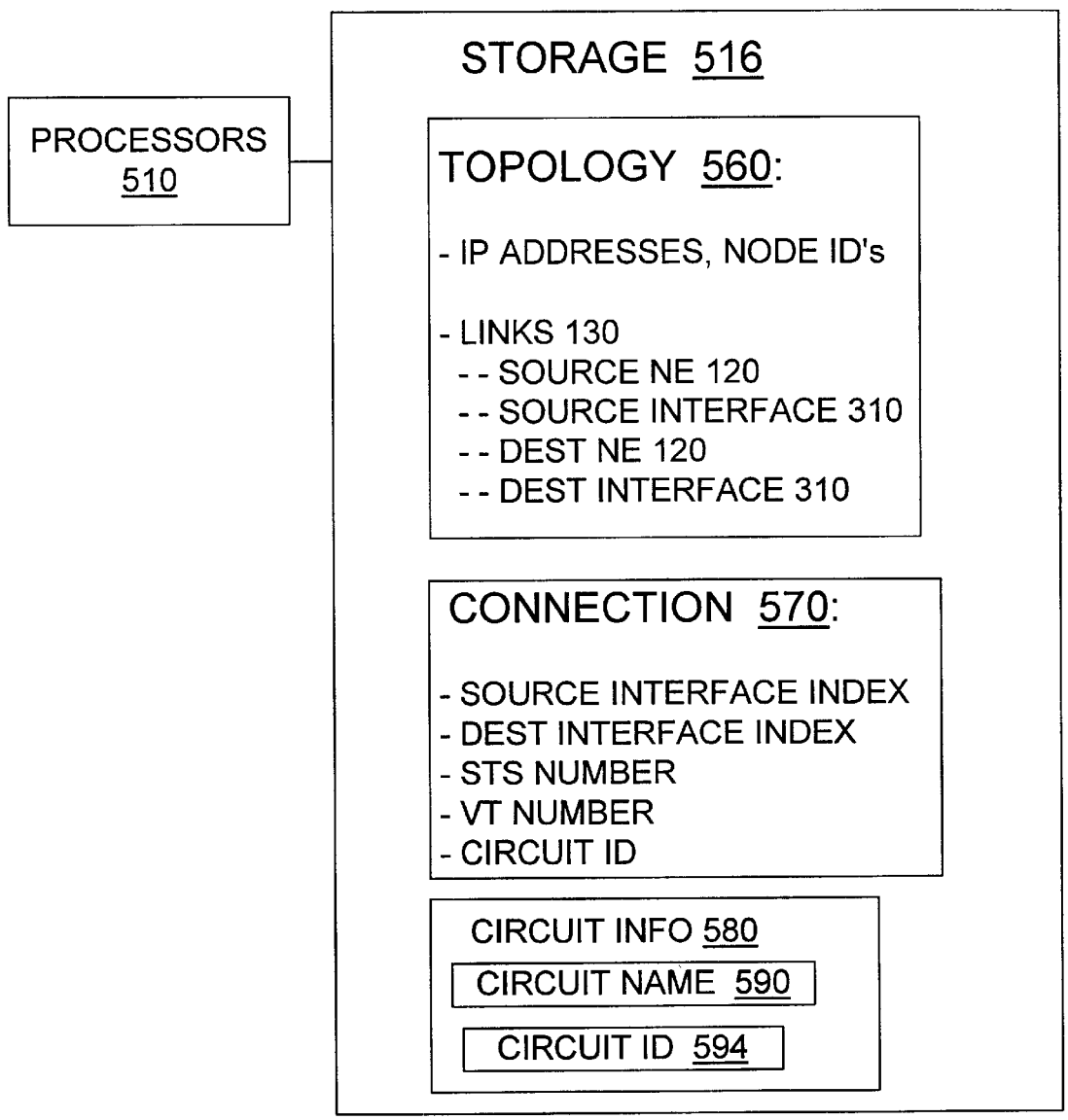
FIG. 5 is a block diagram showing an architecture and data structures of a network element according to the present invention.

I.1. When an NE 120 is started, the NE runs a link state protocol to discover network topology 560 (FIG. 5). In some embodiments, the link state protocol is based on OSPF (Open Shortest Path First, a routing protocol), or RIP (Routing Information Protocol), though the invention is not limited to such embodiments. Topology information 560 includes:

I.1A. The IP addresses and node ID's (hardware based ID's) of all NE's in the managed network 110 (managed via the NMS).

I.1B. Information on all the links 130 in the managed network. Each link 130 is a unidirectional optical fiber link. For each link 130, the following information is stored:

I.1B-1. The link's source NE 120. This is a pointer to an object having the information I.1A (see above) for the source NE.

We will sometimes use the same name and reference numeral to denote an entity and information describing the entity. For example, "NE 120" may refer to an NE and to an object abstracting the NE, or to a pointer to the object.

I.1B-2. The link's source interface 310, also called "entity index" herein. This is a unique ID identifying the source NE's port 310 to which the link is connected. The interface (entity) indices can be generated using known globally unique identifier generation techniques. In some embodiments, the interface index is generated using the NE's MAC address, the slot number of the NE's slot housing the card on which the port 310 is located, and the port number on the card.

I.1B-3. The link's destination NE 120 (pointer to an NE object, similar to I.1B-1).

I.1B-4. Destination interface index (see I.1B-2).

I.1B-5. Other information (not shown in FIG. 5) including the link speed (e.g. OC-3, OC-48, etc.), whether the link is used for protected or working traffic, and perhaps other information.

I.2. Each NE 120 also stores a connection object 570 which describes all the cross-connections on the NE. For each cross connection, the connection object has the following information:

I.2A. Source interface index (see I.1B-2).

I.2B. Destination interface index.

I.2C. STS number. Also, VT number if this is a VT connection.

I.2D. Circuit ID identifying the circuit 210 for this connection. The circuit ID includes:

I.2C-1. A hardware-based node ID of a source NE for the circuit (see I.1A).

I.2C-2. A unique ID identifying the circuit across the managed network 110.

The NE 120 may be non-VT capable, i.e. the NE may be unable to perform VT cross connections. Nonetheless, the STS's that are cross-connected by the NE may carry VT circuits. An STS circuit carrying one or more VT circuits through a non-VT-capable NE or NE's will be called a "VT tunnel" herein. Clearly, such an STS circuit can correspond to multiple VT circuit ID's. However, the VT tunnel is associated with its own circuit ID.

The circuit ID for a circuit is generated by the NMS when the circuit is first created. If the circuit was created via some other management system, the circuit ID may be absent or invalid (e.g. 0).

I.3. For each circuit 210, a source NE for the circuit (the actual NE, not an object) stores circuit information 580 describing the whole circuit. Circuit information 580 includes, for each circuit:

I.3A. Circuit name 590. This name is used to communicate with the user. The circuit name is not stored on the NE's in some embodiments.

I.3B. Circuit ID 594 (see I.2D).

Figure 6:
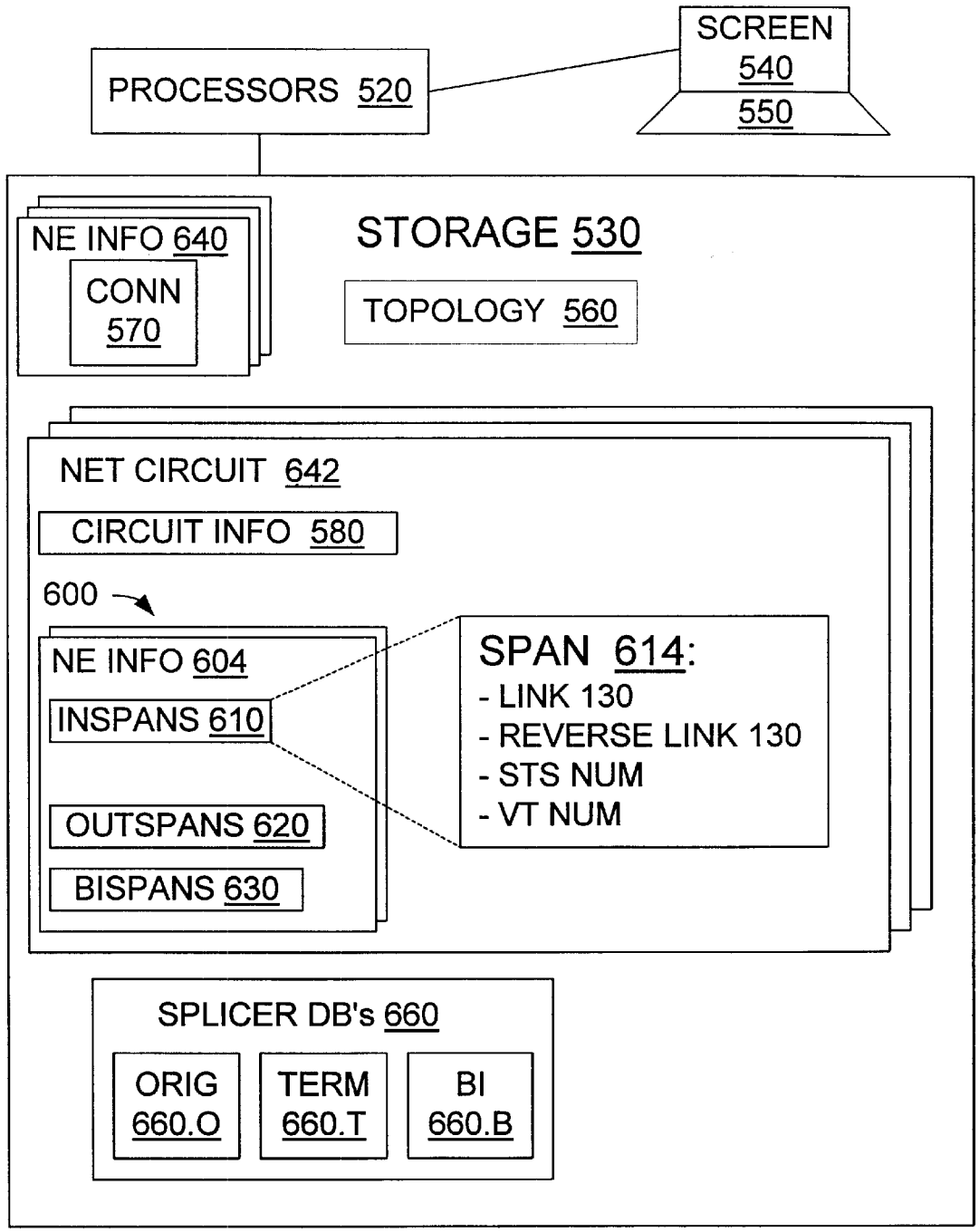
FIG. 6 is a block diagram showing an architecture and data structures in a network management system according to the present invention.

I.4. When NMS 114 is started, it collects the information I.1, I.2 and I.3 from the NE's. As shown in FIG. 6, the NMS storage 530 stores topology information 560. For each NE 120, the NMS also stores NE information 640 which includes connection information 570 received from each NE.

I.4A. For each circuit, NMS 114 builds a network circuit object 642 which includes:

I.4A-1. Circuit information 580 received from the NEs (see I.3 above).

I.4A-2. Information on each span of the circuit (not shown).

I.4A-3. List 600 of all the NE's 120 through which the circuit passes. For each NE 120, the following information 604 is stored:

I.4A-3A. List 610 of all the input spans on this NE for the circuit. For example, in FIG. 2, NE 120C has one input span for circuit 210.B. The span is circuit segment 210B.1.

Each span in list 610 is defined by an object 614 which identifies the span's link and the reverse link (i.e. the opposite direction link connected to the same ports 310). For each link, its source and destination NE's and source and destination entity indices are provided.

In addition, the span object 614 specifies the STS and VT numbers for the span. If the circuit is bi-directional, the opposite directions have the same STS and VT numbers on the two links of the span. The two links connect to the same ports 310.

In some embodiments, the opposite directions can have different STS and VT numbers on the same span. Object 614 stores the STS and VT numbers for each direction.

In some embodiments, the opposite directions can go over links not connected to the same interfaces. In some embodiments, the opposite directions may not even pass through the same NE's. Appropriate information is stored as needed.

I.4A-3B. List 620 of output spans on the NE for the circuit. For example, in FIG. 2, circuit 210.B has one output span (segment 210.B.2) on NE 120C. Each span is abstracted by an object 614, as in I.4A-3A.

I.4A-3C. List 630 of bi-directional spans. In FIG. 2, NE 120C has two bi-directional spans for circuit 210.A. One bi-directional span consists of segments 210.A.1, 210.A.4. The other bi-directional span consists of segments 210.A.2, 210.A.3. Each span is abstracted by an object 614, as in I.4A-3A.

I.4A-4. All the drop points (drop NE's) for the circuit (not shown in FIG. 6).

NMS 114 analyzes the information in its storage 530 to trace each circuit 210. The NMS builds "splicer" data bases 660 for incomplete circuits. The splicer data bases are built as follows.

Figure 7:
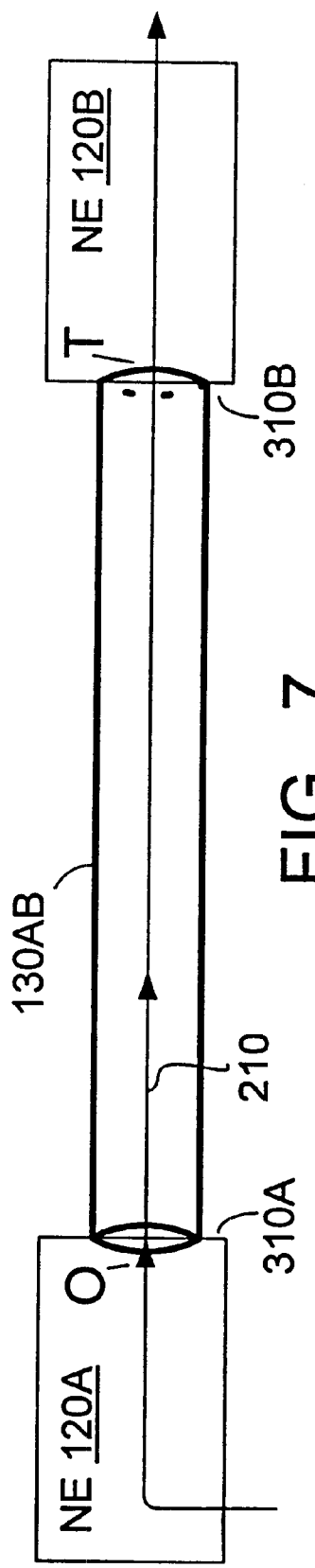
FIGS. 7–11 are block diagrams showing network elements and circuits according to the present invention.

I.4B. From the point of view of a single circuit span between adjacent NE's 120, a circuit can be unidirectional, bi-directional, or "unidirectional/protected" (the kind used in unidirectional path switched rings, i.e. UPSR's). FIG. 7 illustrates a unidirectional circuit 210. This circuit is unidirectional from the point of view of its span between the adjacent NE's 120A, 120B. Other spans of the same circuit could be unidirectional/protected since some circuit segments could be carried by UPSR's.

Circuit 210 goes over a unidirectional link 130AB from an interface 310A on NE 120A to an interface 310B on NE 120B. In our terminology, the circuit is called "originating" at interface 310A and "terminating" at interface 310B. We use the letter "O" for originating in FIG. 7, and "T" for terminating.

Figure 8:
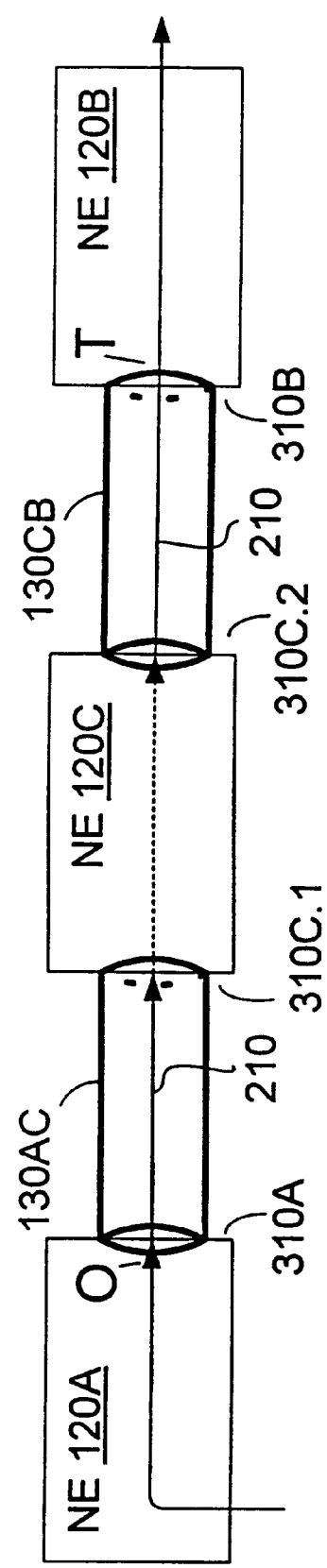

In FIG. 8, link 130AB has been removed, and NE 120C has been inserted. A link 130AC goes from interface 310A of NE 120A to an interface 310C.1 of NE 120C. A link 130CB goes from an interface 310C.2 on NE 120C to interface 310B of NE 120B.

After the NMS has conducted circuit discovery and thus has collected all the NE's and the spans for the circuit 210, the NMS has discovered that the circuit 210 is incomplete at points 310A, 310B. More particularly:

I.4B-1. The NMS has discovered that the circuit segment originating on the interface 310A of NE 120A is not cross connected by NE 120C. Therefore, the NMS adds the circuit 210 to splicer data base 660.0 (FIG. 6) of incomplete "originating" circuits. The information added to data base 660.0 includes the NE 120A (i.e. a pointer to an object abstracting the NE 120A), the interface 310A, the circuit 210, and the STS number for the circuit for the port 310A. If the circuit is a VT circuit, the information also includes a VT number identifying the VT. (In the embodiment being described, only one VT size is supported, so there is no need for identifying a VT group. In other embodiments, different VT sizes are supported. Each VT number identifies both a VT group and a VT within the group.)

I.4B-2. The NMS has discovered that the circuit segment terminating on the interface 310B is not cross connected by NE 120C. Therefore, the NMS adds the circuit 210 to splicer data base 660.T of incomplete "terminating" circuits. The information added is of the same kind as described in I.4B-1 above (i.e., it includes NE 120C, interface 310B, circuit 210, and the STS and VT numbers).

Figure 9:
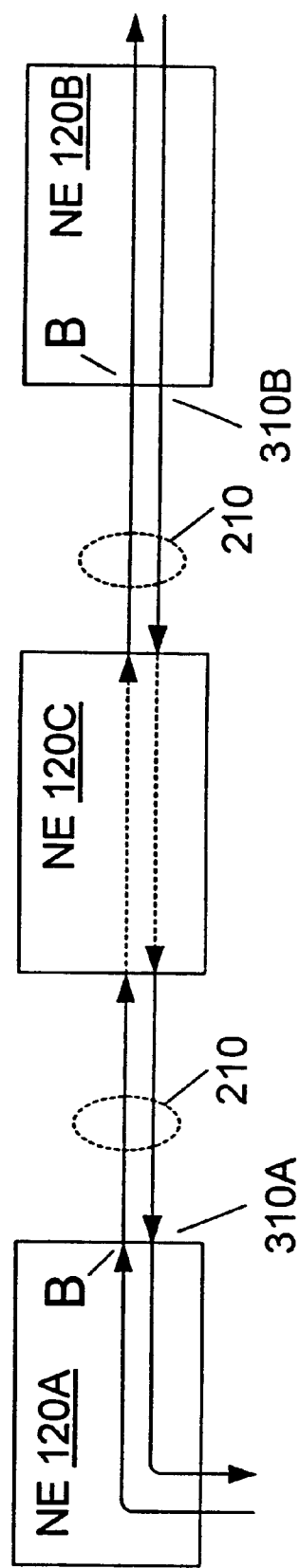

I.4C. In FIG. 9, circuit 210 was bi-directional between the NE's 120A, 120B before NE 120C was added. In our terminology, the circuit 210 was bi-directional both at interface 310A and at interface 310B, as indicated by letters B in FIG. 9. If a circuit is bi-directional at an interface, the NMS classifies the circuit is incomplete if either the outgoing or the incoming direction of the circuit, or both, are not cross connected by the NE at the other end of the span (by NE 120C in FIG. 9). In any of the three cases (i.e. if (i) the outgoing direction is not cross connected but the incoming direction is cross connected, (ii) the incoming direction is not cross connected but the outgoing direction is, or (iii) neither the incoming nor the outgoing directions are cross connected), the NMS adds the circuit to splicer data base 660.B of incomplete "bi-directional" circuits. In the case of FIG. 9, two entries are added to data base 660.B, one entry for each of the interfaces 310A, 310B.

Figure 10:
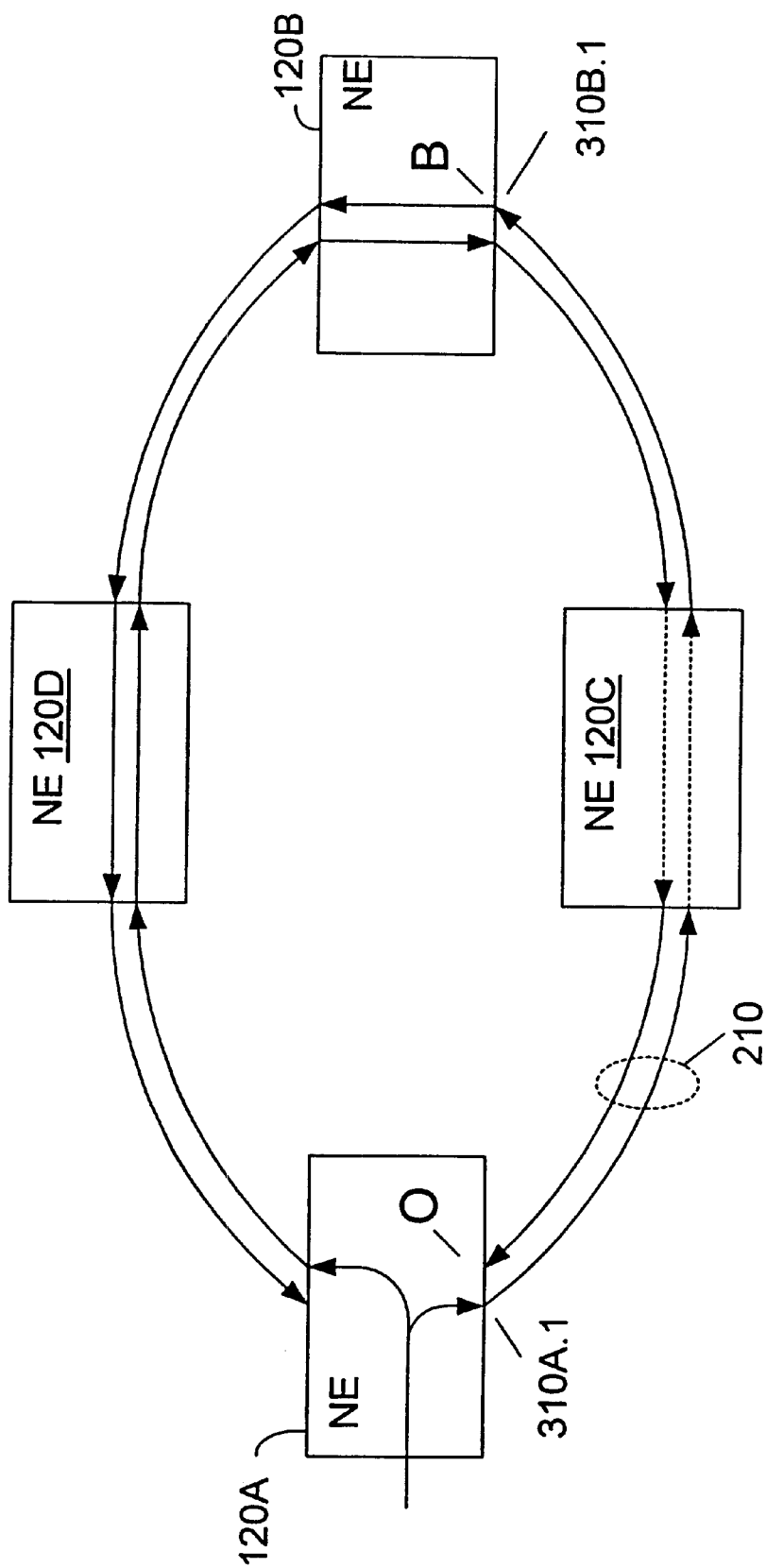

I.4D. In FIG. 10, circuit 210 goes through a UPSR. As is well known, a UPSR carries the same traffic in both directions on the ring, i.e. clockwise and counter clockwise. One of the two directions is the working direction, and the other direction is the protection direction.

In FIG. 10, circuit 210 is added to the UPSR at NE 120A and dropped at NE 120B and, possibly, other NE's. In the counter clockwise direction, circuit 210 leaves NE 120A on interface 310A.1. In the clockwise direction, circuit 210 arrives at NE 120A on the same interface 310A.1, but NE 120A does not cross connect the arriving traffic. Therefore, on interface 310A.1, the circuit is "originating". On interface 310B.1 of NE 120B, the circuit is "bi-directional".

In FIG. 10, NE 120C has been inserted between NE's 120A and 120B. Circuit 210 is incomplete. The NMS adds circuit 210 on interface 310A.1 to "originating" splicer data base 660.0, and circuit 210 on interface 310B.1 to "bi-directional" data base 660.B.

Of note, the circuit span between NE's 120B and 120D is bi-directional at both ends of the span. If NE 120C were inserted between NE's 120B and 120D, the incomplete circuit entries at both ends of the span would be added to the bi-directional data base 660.B, as in case I.4C (FIG. 9).

In some embodiments, the data bases 660.0, 660.T, 660.B are implemented using a Map class defined by Java JDK 1.2 available from Sun Microsystems, Inc. of Mountain View, Calif. ("JDK" stands for Java Development Kit.) These data bases can be searched by a key consisting of an NE (i.e. NE object), an interface index (index of the interface 310 on the NE), and a direction (originating, terminating, or bi-directional).

I.5. The NMS reports the discovery progress to the user via, for example, graphical user interface (GUI). If the user commands the NMS to heal the circuits through the newly added NE 120C, the NMS performs step II below.

II. Healing the Circuits

The entry point to the circuit healing code is the method "addNeToNetwork(NetElement ne, Observer obs)" in file NetCircuitSplicer in microfiche Appendix 1. The "ne" object parameter abstracts the new NE 120C. The "obs" parameter abstracts a status bar in the graphical user interface. The status bar is used to report the progress (the number of circuits healed) to the user.

The following operations are performed:

II.1. Lock splicer data bases 660.0, 660.B, 660.T. The data bases will be unlocked after the NMS healing code has finished running.

II.2. From the network topology information 560 (FIG. 6) in NMS storage 530, find all links 130 sourced on the new NE 120C. Create a linked list "netLinksList" of such links (i.e. of objects representing the links).

II.3. From topology information 560, for each link 130 in the list, find the reverse link.

Create a linked list "reverseLinksList" of the reverse links. This operation helps verify that each link has a reverse link. (Some embodiments, including non-SONET embodiments, do not require reverse links to be present, and do not obtain a list of reverse links.)

II.4. Traverse the list of reverse links as follows:

A variable aLink traverses the reverse links list from the first to the last but one link. E.g., if the reverse links list contains the following links 130, in the order shown:

L0, L1, L2, L3 then aLink takes the value L0, then L1, then L2.

For each aLink value, a variable bLink traverses the reverse links list from the next element after aLink to the end of the list. In the example above (when the list contains links L0, L1, L2, L3), if aLink is L1, then bLink takes the values L2, L3.

In traversing the list, for each pair (aLink, bLink):

(1) splice the corresponding circuits 210 (method spliceConnForMatchedListeners(ne, aLink, bLink)), as shown in part III below.

(2) report the number or percentage of spliced circuits to the user via the GUI.

When the list of reverse links has been traversed, the healing process is completed (a return is executed).

III. Splicing the Connections for Two Incoming Links (Method spliceConnForMatchedListeners(ne, aLink, bLink)).

The "ne" parameter is an object abstracting the new NE (i.e. NE 120C).

Figure 11:
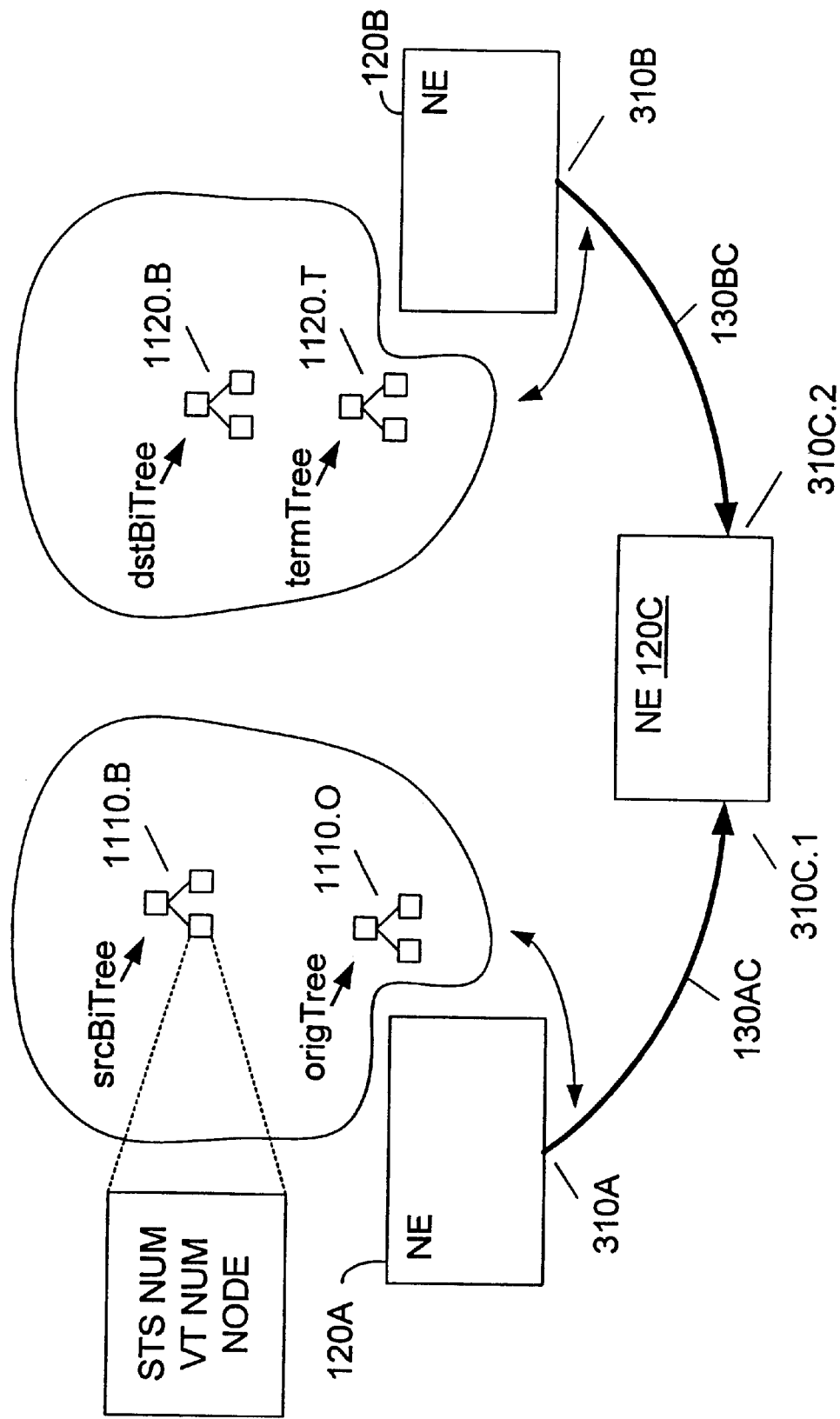

In this part, we will refer to links aLink and bLink as links 130AC and 130BC respectively. See FIG. 11. Each of the links 130AC and 130BC is an incoming link to the new NE 120C. Of note, NE 120C can be connected to more than two NE's, as shown in FIG. 4. Also, it is possible for links 130AC, 130BC to connect NE 120C to the same NE, e.g. NE 120A. Each link object 130AC, 130BC includes the respective source and destination NE's and the source and destination interfaces for the link. (We will use the same reference numerals for links and objects abstracting the links.) Consistent with FIG. 11, we will use the following notation:

The source NE of link 130AC will be denoted as NE 120A; the source interface will be denoted as interface 310A.

We know that the destination NE for links 130AC, 130BC is NE 120C. The destination interfaces will be denoted as 310C.1, 310C.2 respectively.

The source NE of link 130BC will be denoted as NE 120B. The source interface will be denoted as 310B.

It is possible that the NE's 120A, 120B are the same NE, and the interfaces 310A, 310B are the same or different interfaces on the same NE.

Splicing is accomplished as follows.

III.1. Get a pointer "origTree" to a tree data structure 1110.0 representing incomplete circuits in originating data base 660.0. Each node in the tree represents a key for an incomplete circuit entry created at I.4B-1. The tree contains all the keys for the NE 120A, interface 310A. Each key contains the corresponding STS and VT numbers and a pointer "node" to NE information for NE 120A.

III.2. Get a pointer "termTree" to a tree 1120.T representing incomplete "terminating" circuits (in terminating data base 660.T) for the NE 120B, interface 310B. The tree 1120.T has the same kind of information as the tree 1110.0.

III.3. Splice the circuits from the tree 1110.0 and the tree 1120.T, as described in part IV below. This step sets up cross connections on NE 120C to heal unidirectional circuits from interface 310A to interface 310B.

Part IV refers to "NE 1" and "NE 2". When part IV is executed, "NE 1" is NE 120A, and "NE 2" is NE 120B. ("NE 1" and "NE 2" can be thought of as parameters to a method represented by part IV.)

III.4. Get a pointer "srcBiTree" to a tree 1110.B representing incomplete circuits in bi-directional data base 660.B for NE 120A, interface 310A.

III.5. Get a pointer "dstBiTree" to a tree 1120.B of incomplete circuits in bi-directional data base 660.B for the NE 120B, interface 310B.

Trees 1110.B, 1120.B have the same kind of information as tree 1110.0.

III.6. Splice the bi-directional circuits from trees 1110.B, 1120.B, as described in part IV below. This step sets up cross connections on NE 120C to heal bi-directional circuits between the interfaces 310A and 310B. When part IV is executed, "NE 1" is NE 120A, and "NE 2" is NE 120B.

III.7. Splice the unidirectional/protected circuits from trees 1110.0, 1120.B, as described in part IV below. This step sets up cross connections on NE 120C to heal unidirectional/protected circuits which are unidirectional at interface 310A and bi-directional at interface 310B. When part IV is executed, "NE 1" is NE 120A, and "NE 2" is NE 120B.

III.8. Set up cross connections on NE 120C to heal unidirectional circuits from interface 310B to interface 310A. This is similar to steps III.1, III.2, III.3, but with NE's 120A and 120B interchanged. When part IV is executed, "NE 1" is NE 120B, and "NE 2" is NE 120A.

III.9. Set up cross connections on NE 120C to heal unidirectional/protected circuits which are unidirectional at interface 310B and bi-directional at interface 310A. This step is similar to step III.7, but with NE's 120A and 120B interchanged. When part IV is executed, "NE 1" is NE 120B, and "NE 2" is NE 120A.

IV. Splicing the Circuits

Given the Incomplete Circuit Trees

At this step, we have two incomplete trees (e.g. trees 1110.0, 1120.T) for two NE's 120 and their corresponding interfaces 310. We will refer to one of the NE's as "NE 1", and to the other NE as "NE 2". To facilitate reference to the drawings, without loss of generality, we will assume that NE 1 is NE 120A, NE 2 is NE 120B, and the corresponding interfaces are 310A and 310B. The incomplete circuit directions for NE's 120A, 120B will be denoted respectively as dirA, dirB. For example, for case III.3, dirA =ORIGINATING, and dirB=TERMINATING; for case III.6, dirA=dirb=BI-DIRECTIONAL; and so on.

The respective incomplete circuit trees for NE's 120A, 120B will be denoted as treeA, treeB. For example, for the case III.3, treeA is tree 1110.0 and treeB is tree 1120.T. The corresponding links from NE's 120A, 120B to NE 120C will be assumed to be links 130AC, 130BC.

Figure 12:
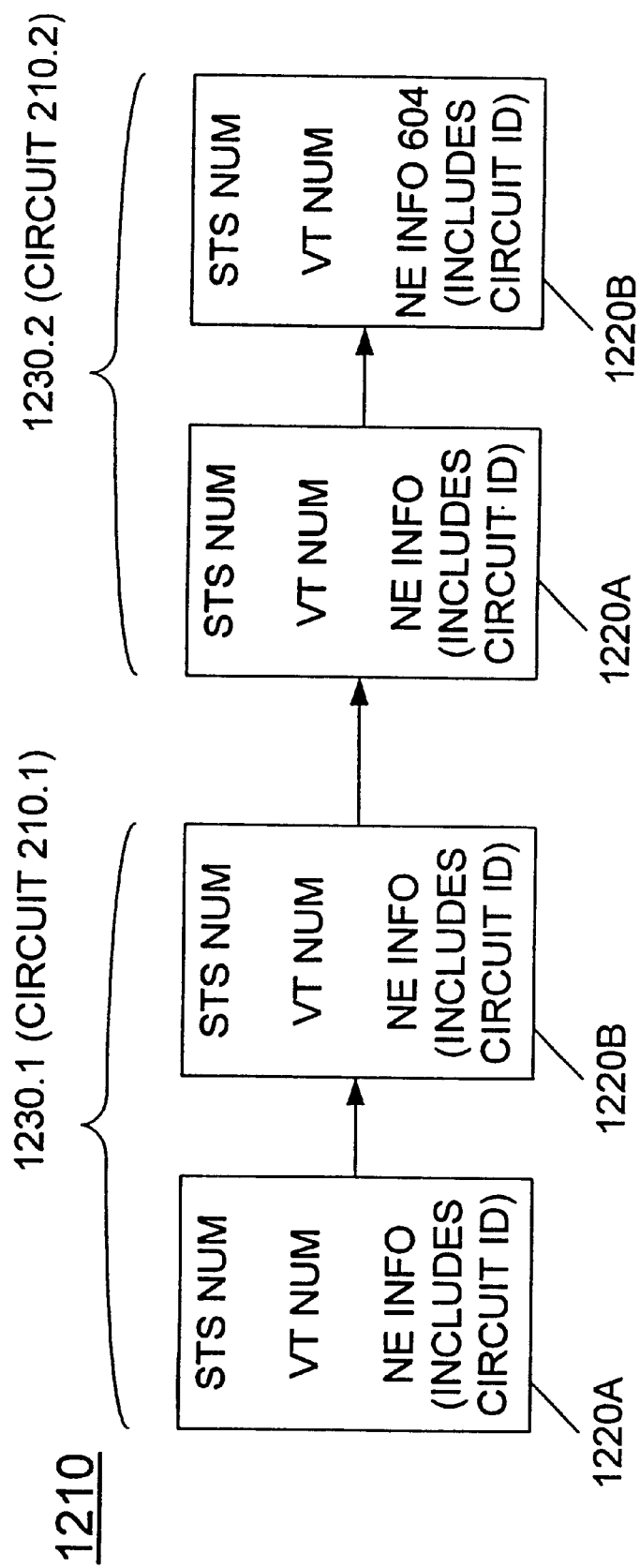
FIG. 12 shows a data structure built by a network management system according to the present invention.
Figure 13:
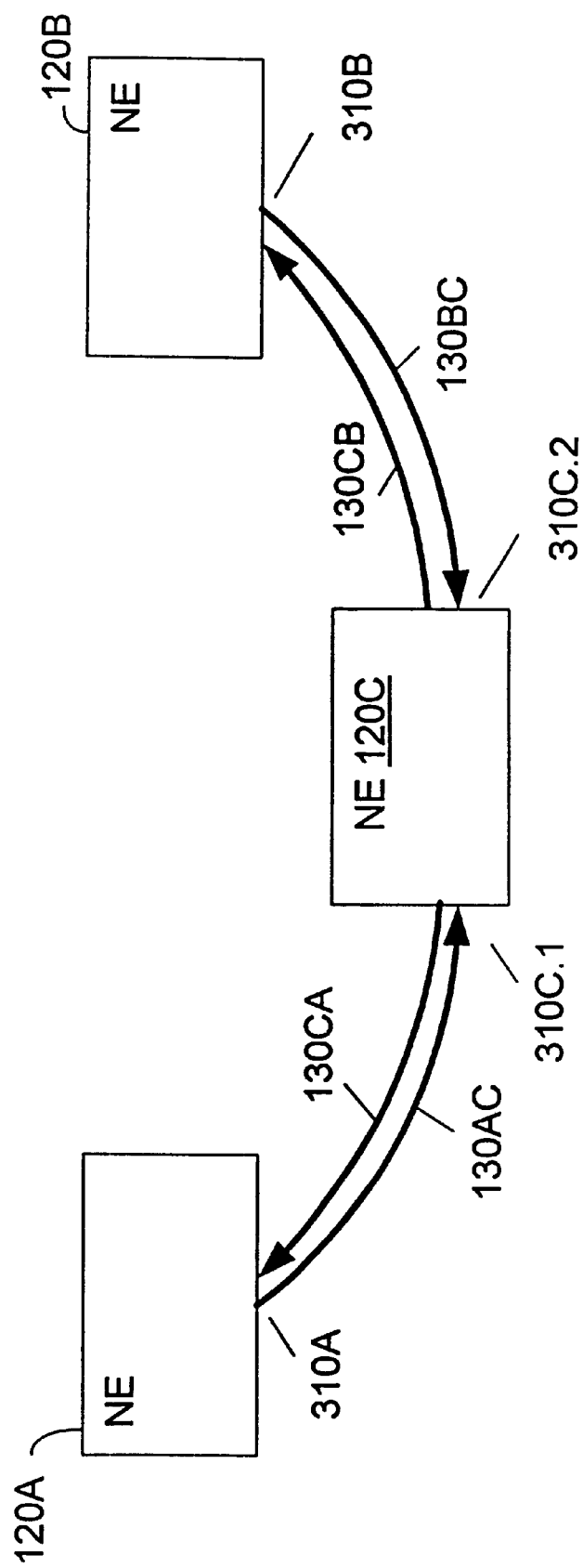
FIG. 13 is a block diagram illustrating network elements and links in a network managed according to the present invention.

IV.1. Create a linked list 1210 (FIG. 12) of items 1220A, 1220B which define circuits to be spliced. The items are grouped in pairs 1230.1, 1230.2, and so on. In each pair, the first item is 1220A, and the second item is 1220B. The two items correspond to a single circuit 210 (circuit 210.1 in pair 1230.1, 210.2 in pair 1230.2, and so on). Each item 1220A, 1220B defines the STS and VT numbers for the circuit. Each of the two items also includes a pointer to NE information describing the NE 120C for the circuit. The NE information incorporates the circuit ID. (In Appendix 1, each item 1220A, 1220B is an object of class SpliceListener; see method findCktIdMatchedListeners in class NetCircuitSplicer.)

Linked list 1210 is created as follows. The tree treeA is traversed. For each node "nodeA" of tree treeA, the tree treeB is traversed. For each pair of nodes (nodeA, nodeB) of respective trees treeA, treeB, if their STS and VT numbers are equal, and the circuit ID's are equal, then respective items 1220A, 1220B are added to list 1210. (For STS circuits, their VT numbers are set to a predefined invalid value, e.g. zero.)

IV.2. From the NE information in item 1220A, determine if the NE 120C is VT capable.

IV.3. From the topology 560 (FIG. 6), find reverse links 130CA, 130CB that connect to the same interfaces 310 as respective links 130AC, 130BC. See FIG. 11.

IV.4. Traverse the list 1210, and for each pair of items 1220A, 1220B, splice the corresponding circuit 210 as follows.

IV.4A. If the VT number in item 1220A indicates a valid VT (i.e. the circuit is a VT circuit), but NE 120C is not VT capable (see IV.2), then the embodiment of Appendix 1 does not splice the circuit. That embodiment proceeds to the next pair 1220A, 1220B in list 1210.

Some embodiments splice the corresponding STS's, thus creating a VT tunnel through NE 120C. The corresponding STS number is obtained from item 1220A or 1220B.

IV.4B. Add NE 120C (i.e. an object 604 abstracting the NE) to the list 600 of NE's in network circuit object 642 (FIG. 6) for the circuit. A pointer to the circuit object is obtained from the NE information in item 1220A or 1220B.

IV.4C. Create a span object 614 for the span between NE's 120A, 120C. Add the span object 614 to list 610, 620, or 630 (FIG. 6) of object 604 for NE 120C (see IV.4B) for the circuit. The list to which the span is added is determined as shown in the following table:

| Condition | Span list |
|---|---|
| dirA = BI-DIRECTIONAL or dirB = BI-DIRECTIONAL | bi-directional span list 630 |
| dirA ≠ BI-DIRECTIONAL, and dirB = TERMINATING | input span list 610 |
| dirA ≠ BI-DIRECTIONAL, and dirB = ORIGINATING | output span list 620 |

IV.4D. Create a span object 614 for the span between NE's 120C, 120B. Add the span object to list 15 610, 620, or 630 (FIG. 6) for NE 120C for the circuit, similarly to step IV.4C.

IV.4E. Call a method on NE 120C (via CORBA) to inform the NE of the two spans and to activate a cross connect or cross connects to interconnect the spans.

IV.4F. Add the span (i.e. a span object 614) between NE's 120A, 120C to list 610, 620, or 630 (FIG. 6) for NE 120A for the circuit. The span list is determined according to the following table:

| dirA | Span list |
|---|---|
| BI-DIRECTIONAL | bi-directional span list 630 |
| TERMINATING | input span list 610 |
| ORIGINATING | output span list 620 |

IV.4G. Similarly, add the span between NE's 120B, 120C to list 610, 620, or 630 (FIG. 6) for NE 120B for the circuit.

If some links were disconnected and traffic had been forced away from these links to protection channels before the new NE was inserted, the user may restore traffic back to the working channels on the restored (healed) circuits through the new NE.

The embodiments described above illustrate but do not limit the invention. The invention is not limited to any particular types of networks, network links, or computer languages. In some embodiments, the network 110 is an SDH (Synchronous Digital Hierarchy) network, or some other type of network. The invention is not limited to particular objects or data structures, or any types of information stored, used or transmitted.

In some embodiments, the circuits are completed as follows. With reference to FIGS. 4–6, NMS 114 determines from the network topology information 560 that the port 310C.1 is no longer connected to port 310B.1. Rather, the two ports are connected to NE 120C. NMS 114 then scans all the ports of NE 120C and discovers that the NE's ports 310C.1, 310C.2 are connected respectively to ports 310A.1, 310B.1. Then, NMS 120C issues a command to NE 120C to connect all the STS signals incoming on port 310C.1 onto the respective outgoing STS's on port 310C.2, and vice versa. Each STS no. "n" incoming on port 310C.1 will be cross-connected onto STS no. "n" outgoing on port 310C.2, and vice versa. The cross-connects on NE 120C will be configured regardless of whether the STS's belong to any circuits.

The invention is not limited to healing of circuits when a new NE is added. Circuits can be interrupted at an NE for other reasons, for example, a user may have defined some circuits incompletely, without defining how the circuits are cross connected by the NE. The NMS may continue the circuits through the NE automatically.

The invention is not limited to embodiments in which every link has a reverse link, or in which every port is bi-directional.

Other embodiments and variation are within the scope of the invention, as defined by the appended claims.

What is claimed is:

1. A computer implemented process for at least partially healing an incomplete circuit in a network comprising a plurality of network elements interconnected by network links, wherein the network elements are to cross connect signals carried by the links to form circuits from said signals, the process comprising:

discovering an incomplete circuit interrupted at a first point and also interrupted at a second point, wherein the circuit can be continued between the first and second points through a first network element; and automatically determining a cross connection to be set up on the first network element to continue said circuit through the first network element in response to said discovering.

2. The computer implemented process of claim 1 wherein the first point is on a second network element connected by a link to the first network element, and the second point is on a third network element connected by a link to the first network element.

3. The computer implemented process of claim 1 further comprising, commanding the first network element to set up said cross connection, and setting up said cross connection utilizing the first network element in response to the commanding.

4. The computer implemented process of claim 1 wherein:

each of said signals comprises a transport signal transmitted on one of said links at regular intervals of time;

the incomplete circuit interrupted at the first point comprises a first transport signal transmitted over a first link;

the incomplete circuit interrupted at the second point comprises a second transport signal transmitted over a second link; and the cross connection cross connects the first transport signal onto the second transport signal.

5. The computer implemented process of claim 1 further comprising:

identifying a circuit having a first ID as incomplete at a point connected to a network element if the network element does not cross connect a circuit having the first ID.

6. The computer implemented process of claim 1 wherein discovering an incomplete circuit comprises:

discovering a first link and a second link connected to the first network element;

searching circuit data for circuits that go over the first link to the first network element but are not continued through the first network element;

searching circuit data for circuits that go over the second link from the first network element but are not continued through the first network element; and discovering a circuit which both (1) goes over the first link to the first network element but is not continued through the first network element, and (2) goes over the second link from the first network element but is not continued through the first network element, the circuit being said incomplete circuit.

7. The computer implemented process of claim 1 wherein discovering an incomplete circuit comprises:

discovering a first link, a second link, a first reverse link of the first link, and a second reverse link of the second link connected to the first network element;

searching circuit data for bi-directional circuits that go over the first link to the first network element and over the first reverse link from the first network element, but are not continued in one or both directions through the first network element;

searching circuit data for bi-directional circuits that go over the second link from the first network element and over the second reverse link to the first network element, but are not continued in one or both directions through the first network element; and discovering a bi-directional circuit which both (1) goes over the first link to the first network element and over the first reverse link from the first network element but is not continued in one or both directions through the first network element, and (2) goes over the second link from the first network element and over the second reverse link to the first network element but is not continued in one or both directions through the first network element, the bi-directional circuit being said incomplete circuit.

8. The computer implemented process of claim 1 wherein discovering an incomplete circuit comprises:

discovering a first link, a second link, and a second reverse link of the second link connected to the first network element;

searching circuit data for circuits that go over the first link to the first network element, but are not continued through the first network element;

searching for circuits that are transmitted over the second link from the first network element and over the second reverse link to the first network element, but are not continued in one or both directions through the first network element; and discovering a circuit which both (1) goes over the first link to the first network element but is not continued through the first network element, and (2) goes over the second link from the first network element and over the second reverse link to the first network element but is not continued in one or both directions through the first network element, the circuit being said incomplete circuit.

9. The computer implemented process of claim 1 wherein the network is a SONET or SDH network.

10. An apparatus for at least partially healing an incomplete circuit in a network comprising a plurality of network elements interconnected by network links, wherein the network elements are to cross connect signals carried by the links to form circuits from said signals, comprising:

computer circuitry to discover an incomplete circuit interrupted at a first point and also interrupted at a second point, wherein the circuit can be continued between the first and second points through a first network element; and computer circuitry to automatically determine a cross connection to be set up on the first network element to continue said circuit through the first network element in response to a discovery of said incomplete circuit.

11. The apparatus of claim 10, further comprising:

computer circuitry to identify a circuit having a first ID as incomplete at a point connected to a network element if the network element does not cross connect a circuit having the first ID.

12. The apparatus of claim 10, wherein the computer circuitry to discover an incomplete circuit comprises:

computer circuitry to discover a first link and a second link connected to the first network element;

computer circuitry to search circuit data for circuits that go over the first link to the first network element but are not continued through the first network element;

computer circuitry to search circuit data for circuits that go over the second link from the first network element but are not continued through the first network element; and computer circuitry to discover a circuit which both (1) goes over the first link to the first network element but is not continued through the first network element, and (2) goes over the second link from the first network element but is not continued through the first network element, the circuit being said incomplete circuit.

13. The apparatus of claim 10, wherein the computer circuitry to discover an incomplete circuit comprises:

computer circuitry to discover a first link, a second link, a first reverse link of the first link, and a second reverse link of the second link connected to the first network element;

computer circuitry to search circuit data for bi-directional circuits that go over the first link to the first network element and over the first reverse link from the first network element, but are not continued in one or both directions through the first network element;

computer circuitry to search circuit data for bi-directional circuits that go over the second link from the first network element and over the second reverse link to the first network element, but are not continued in one or both directions through the first network element; and computer circuitry to discover a bi-directional circuit which both (1) goes over the first link to the first network element and over the first reverse link from the first network element but is not continued in one or both directions through the first network element, and (2) goes over the second link from the first network element and over the second reverse link to the first network element but is not continued in one or both directions through the first network element, the bi-directional circuit being said incomplete circuit.

14. The apparatus of claim 10, wherein the computer circuitry to discover an incomplete circuit comprises:

computer circuitry to discover a first link, a second link, and a second reverse link of the second link connected to the first network element;

computer circuitry to search circuit data for circuits that go over the first link to the first network element, but are not continued through the first network element;

computer circuitry to search for circuits that are transmitted over the second link from the first network element and over the second reverse link to the first network element, but are not continued in one or both directions through the first network element; and computer circuitry to discover a circuit which both (1) goes over the first link to the first network element but is not continued through the first network element, and (2) goes over the second link from the first network element and over the second reverse link to the first network element but is not continued in one or both directions through the first network element, the circuit being said incomplete circuit.

15. The apparatus of claim 10, wherein the network is a SONET or SDH network.

16. A computer readable medium comprising one or more computer instructions for causing computer circuitry to implement a process for at least partially healing an incomplete circuit in a network comprising a plurality of network elements interconnected by network links, wherein the network elements are to cross connect signals carried by the links to form circuits from said signals, the process comprising:

discovering an incomplete circuit interrupted at a first point and also interrupted at a second point, wherein the circuit can be continued between the first and second points through a first network element; and automatically determining a cross connection to be set up on the first network element to continue said circuit through the first network element in response to said discovering.

17. The computer readable medium of claim 16, wherein the method further comprises:

identifying a circuit having a first ID as incomplete at a point connected to a network element if the network element does not cross connect a circuit having the first ID.

18. The computer readable medium of claim 16, wherein discovering an incomplete circuit comprises:

discovering a first link and a second link connected to the first network element;

searching circuit data for circuits that go over the first link to the first network element but are not continued through the first network element;

searching circuit data for circuits that go over the second link from the first network element but are not continued through the first network element; and discovering a circuit which both (1) goes over the first link to the first network element but is not continued through the first network element, and (2) goes over the second link from the first network element but is not continued through the first network element, the circuit being said incomplete circuit.

19. The computer readable medium of claim 16, wherein discovering an incomplete circuit comprises:

discovering a first link, a second link, a first reverse link of the first link, and a second reverse link of the second link connected to the first network element;

searching circuit data for bi-directional circuits that go over the first link to the first network element and over the first reverse link from the first network element, but are not continued in one or both directions through the first network element;

searching circuit data for bi-directional circuits that go over the second link from the first network element and over the second reverse link to the first network element, but are not continued in one or both directions through the first network element; and discovering a bi-directional circuit which both (1) goes over the first link to the first network element and over the first reverse link from the first network element but is not continued in one or both directions through the first network element, and (2) goes over the second link from the first network element and over the second reverse link to the first network element but is not continued in one or both directions through the first network element, the bi-directional circuit being said incomplete circuit.

20. The computer readable medium of claim 16, wherein discovering an incomplete circuit comprises:

discovering a first link, a second link, and a second reverse link of the second link connected to the first network element;

searching circuit data for circuits that go over the first link to the first network element, but are not continued through the first network element;

searching for circuits that are transmitted over the second link from the first network element and over the second reverse link to the first network element, but are not continued in one or both directions through the first network element; and discovering a circuit which both (1) goes over the first link to the first network element but is not continued through the first network element, and (2) goes over the second link from the first network element and over the second reverse link to the first network element but is not continued in one or both directions through the first network element, the circuit being said incomplete circuit.

21. The computer readable medium of claim 16, wherein the network is a SONET or SDH network.

* * * * *